US006649053B2

(12) United States Patent
Caiozza

(10) Patent No.: US 6,649,053 B2
(45) Date of Patent: Nov. 18, 2003

(54) MAGNET ASSEMBLY FOR AN OIL FILTER AND AN OIL PAN

(76) Inventor: Joseph C. Caiozza, 321 W. Market St., Long Beach, NY (US) 11561

( * ) Notice: Subject to any disclaimer, the term of this patent is extended or adjusted under 35 U.S.C. 154(b) by 30 days.

(21) Appl. No.: 09/888,117

(22) Filed: Jun. 22, 2001

(65) Prior Publication Data

US 2002/0195382 A1 Dec. 26, 2002

(51) Int. Cl.$^7$ .............................................. B01D 35/06
(52) U.S. Cl. ........................................ 210/222; 210/223
(58) Field of Search ................................. 210/222, 223; 184/6.25; 335/304, 305, 306

(56) References Cited

U.S. PATENT DOCUMENTS 3,480,145 A * 11/1969 Gladden ..................... 210/223
5,238,558 A * 8/1993 Curtis ......................... 204/664

* cited by examiner

Primary Examiner—Matthew O. Savage

(57) ABSTRACT

A magnet assembly apparatus is provided for attachment to a portion of a motor vehicle, such as the top of an oil filter canister or an oil pan member. The magnet assembly apparatus comprises first and second bottom magnet unit reception cup members made from ferromagnetic material. The cup members include retention pin reception channels. A plurality of first magnet units are placed in the first bottom magnet unit reception cup member in a first magnetic polarity orientation. A plurality of second magnet units are placed in the second bottom magnet unit reception cup member in a second magnetic polarity orientation, which is opposite to the first magnetic polarity orientation. A locking pin is received in the respective retention pin reception channels. Assembly-to-vehicle mounting means are connected to the respective bottom magnet unit reception cup members for mounting the magnet assembly apparatus onto the portion of a motor vehicle.

10 Claims, 7 Drawing Sheets

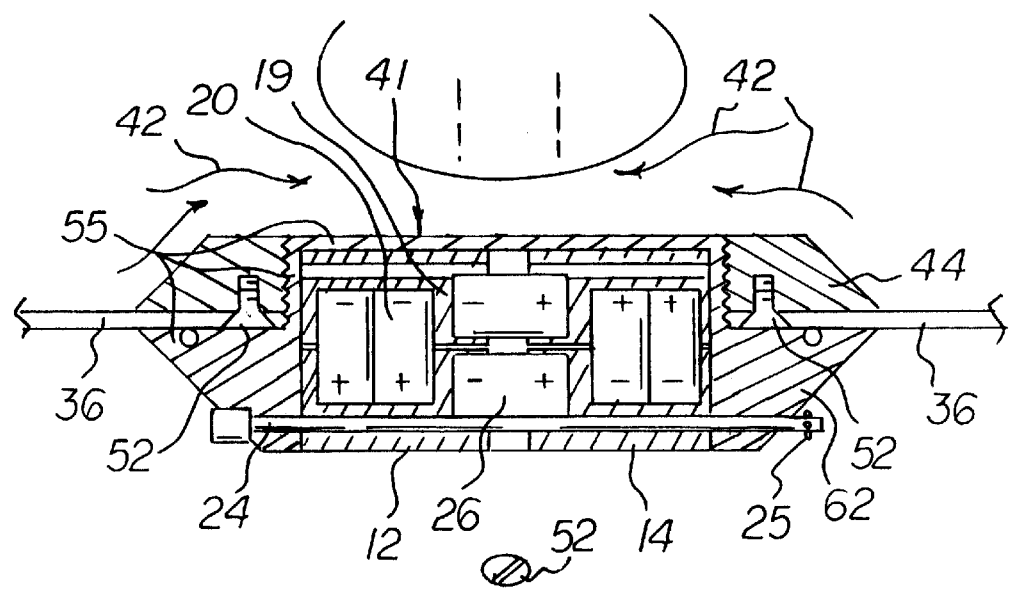
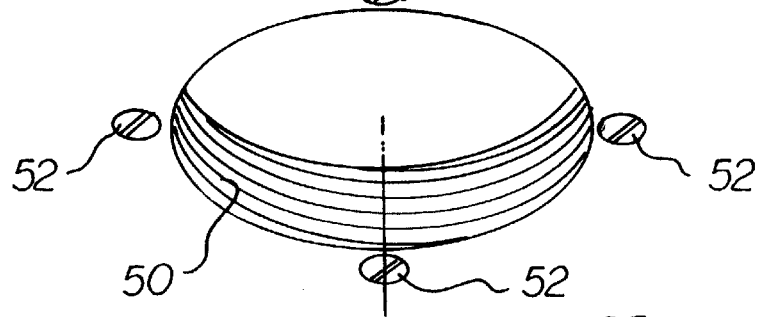
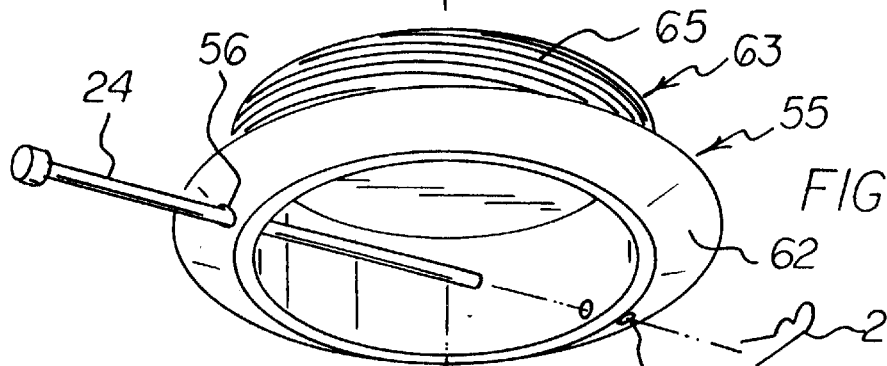
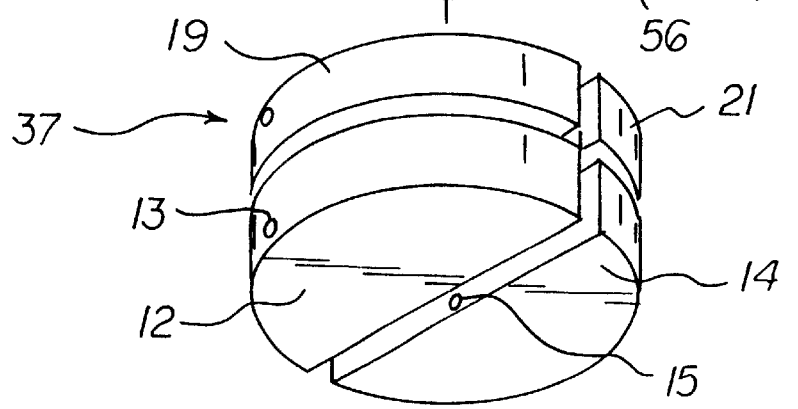

MAGNET ASSEMBLY FOR AN OIL FILTER AND AN OIL PAN

CROSS-REFERENCE TO RELATED APPLICATIONS

This application relates to my following copending U.S. patent applications: Ser. No. 09/888,103, filed concurrently herewith, for "Combined Oil Filter and Magnet Apparatus", Ser. No. 09/702,399, filed Oct. 31, 2000, for "Oil Pan Containing a Magnet Filter Apparatus", now U.S. Pat. No. 6,524,476, and Ser. No. 09/823,397, filed Mar. 31, 2001, for "Oil Pan Containing a Magnet Filter Apparatus", now U.S. Pat. No. 6,503,393.

BACKGROUND OF THE INVENTION

1. Field of the Invention

The present invention relates generally to devices for removing metal particles from lubricating oil circulating in an internal combustion engine and, more particularly, to magnet assemblies especially adapted for separating and retaining metal particles from the lubricating oil.

2. Description of the Prior Art

Conventionally, lubricating oil in an internal combustion engine is filtered by a conventional oil filter which includes an outer housing and a quantity of filter material contained inside the housing. The present inventor herein has made a number of improvements over such conventional oil filter cartridges, and one such improvement is found in U.S. Pat. No. 5,510,024, incorporated herein by reference. More specifically, U.S. Pat. No. 5,510,024 relates to a magnetic attachment for a conventional oil filter canister. In that patent, the magnetic attachment is attached to the outside of the housing of the oil filter housing using a strap.

In copending patent application Ser. No. 09/888,103, filed concurrently herewith, for "Combined Oil Filter and Magnet Apparatus", incorporated herein by reference, the present inventor discloses a housing for an oil filter which includes magnet module support brackets. A removable and reusable magnet unit is supported by the magnet module support brackets. In this respect, the invention described in the present patent application relates to improvements in removable and reusable magnet units installed on oil filter canisters.

In copending patent application Ser. No. 09/702,399, filed Oct. 31, 2000, for "Oil Pan Containing a Magnet Filter Apparatus", incorporated herein by reference, and in copending patent application Ser. No. 09/823,397, filed Mar. 31, 2001, for "Oil Pan Containing a Magnet Filter Apparatus", incorporated herein by reference, the present inventor discloses removable and reusable magnet units that are installed in association with a vehicle engine oil pan. In this respect, the invention in the present patent application relates to improvements in removable and reusable magnet units installed in or on oil pans.

Thus, while the foregoing body of prior art indicates it to be well known to use removable and reusable magnet units on oil filter canisters, the prior art described above does not teach or suggest a magnet assembly for an oil filter and an oil pan which has the following combination of desirable features: (1) is an improvement for removable and reusable magnet units installed on oil filter housings; and (2) is an improvement in removable and reusable magnet units installed in oil pans. The foregoing desired characteristics are provided by the unique magnet assembly for an oil filter and an oil pan of the present invention as will be made apparent from the following description thereof. Other advantages of the present invention over the prior art also will be rendered evident.

SUMMARY OF THE INVENTION

To achieve the foregoing and other advantages, the present invention, briefly described, provides a magnet assembly apparatus for attachment to a portion of a motor vehicle and comprises a first bottom magnet unit reception cup member made from ferromagnetic material, wherein the first bottom magnet unit reception cup member includes a first retention pin reception channel. A second bottom magnet unit reception cup member is made from ferromagnetic material and is located adjacent to the first bottom magnet unit reception cup member and is coplanar therewith. The second bottom magnet unit reception cup member includes a second retention pin reception channel which is in registration with the first retention pin reception channel.

A plurality of first magnet units are placed in the first bottom magnet unit reception cup member in a first magnetic polarity orientation. A plurality of second magnet units are placed in the second bottom magnet unit reception cup member in a second magnetic polarity orientation. The second magnetic polarity orientation is opposite the first magnetic polarity orientation. A locking pin is received in the first retention pin reception channel and the second retention pin reception channel.

Assembly-to-vehicle mounting means, connected to the first bottom magnet unit reception cup member and the second bottom magnet unit reception cup member, are provided for mounting the magnet assembly apparatus onto the portion of a motor vehicle. The portion of the motor vehicle onto which the magnet assembly apparatus can be mounted include an oil filter canister or an oil pan member.

A locking clip is connected at an end of the locking pin for preventing the locking pin from slipping out from the first retention pin reception channel and the second retention pin reception channel.

Third magnet units are oriented transversely between the first bottom magnet unit reception cup member and the second bottom magnet unit reception cup member. The third magnet units are oriented along a third magnetic polarity orientation which causes magnetic fields of the first magnet units and the second magnet units to be reinforced.

Also, a first top magnet unit reception cup member, made from ferromagnetic material, can be located opposite the first bottom magnet unit reception cup member, wherein the first magnet units are located between the first bottom magnet unit reception cup member and the first top magnet unit reception cup member. Also, a second top magnet unit reception cup member, made from ferromagnetic material, can be located adjacent to the first top magnet unit reception cup member, wherein the second magnet units are located between the second bottom magnet unit reception cup member and the second top magnet unit reception cup member.

Also, fourth magnet units can be provided and oriented transversely between the first top magnet unit reception cup member and the second top magnet unit reception cup member. The fourth magnet units are oriented along a fourth magnetic polarity orientation which causes magnetic fields of the first magnet units, the second magnet units, and the third magnet units to be reinforced.

The assembly-to-vehicle mounting means can include magnet unit support members attached to a housing of an oil filter, wherein the magnet unit support members include lock pin reception channels.

Alternatively, the assembly-to-vehicle mounting means can include means for mounting the magnet assembly apparatus to the oil pan member of an otherwise conventional engine, typically an automobile or truck internal combustion engine. In this case, a magnet support unit includes a first attachment ring portion which includes a pair of third retention pin reception channels and which includes a support connector portion extending upward from the first attachment ring portion. The first bottom magnet unit reception cup member and the second bottom magnet unit reception cup member are received in the magnet support unit and secured to the magnet support unit by the locking pin which is threaded through the third retention pin reception channels, the first retention pin reception channel, and the second retention pin reception channel. The support connector portion includes external threads.

A second attachment ring is attached to an inside portion of the oil pan member. The second attachment ring includes internal threads, and the internal threads are engaged with the external threads when the magnet assembly apparatus is attached to the oil pan member.

With another aspect of the invention, the first bottom magnet unit reception cup member and the second bottom magnet unit reception cup member are formed as a single, integrated combination first/second cup member which includes a first cup portion and a second cup portion separated by an inside cup wall.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved magnet assembly for an oil filter canister and an oil pan which has all of the advantages of the prior art and none of the disadvantages.

It is another object of the present invention to provide a new and improved magnet assembly for an oil filter canister and an oil pan which may be easily and efficiently manufactured and marketed.

It is a further object of the present invention to provide a new and improved magnet assembly for an oil filter canister and an oil pan which is of durable and reliable construction.

An even further object of the present invention is to provide a new and improved magnet assembly for an oil filter canister and an oil pan which is susceptible of a low cost of manufacture with regard to both materials and labor, and which accordingly is then susceptible of low prices of sale to the consuming public, thereby making such magnet assembly for an oil filter canister and an oil pan available to the buying public.

Still yet a further object of the present invention is to provide a new and improved magnet assembly which is an improvement for removable and reusable magnet units installed on oil filters.

Still another object of the present invention is to provide a new and improved magnet assembly that is an improvement in removable and reusable magnet units installed in oil pans.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 8 is a cross-sectional view of the embodiment of the magnet assembly of FIG. 7 taken along line 8—8 thereof.

FIG. 9 is an exploded perspective view of the embodiment of the invention shown in FIGS. 6–8.

DESCRIPTION OF THE PREFERRED EMBODIMENT

Figure 1:
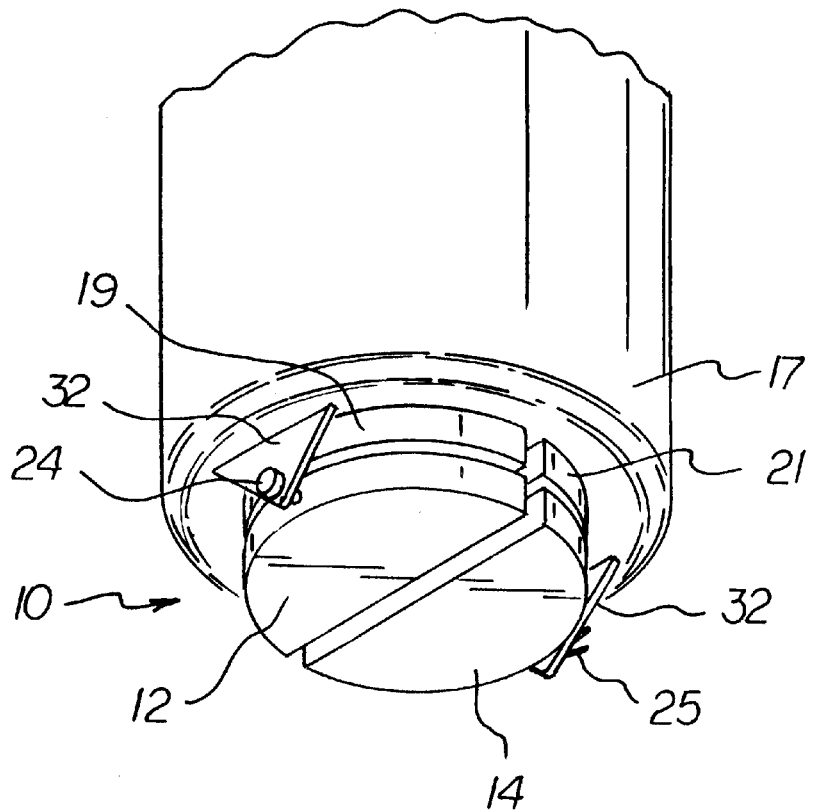
FIG. 1 is a bottom perspective view showing a first embodiment of the magnet assembly of the invention installed on an oil filter housing.
Figure 2:
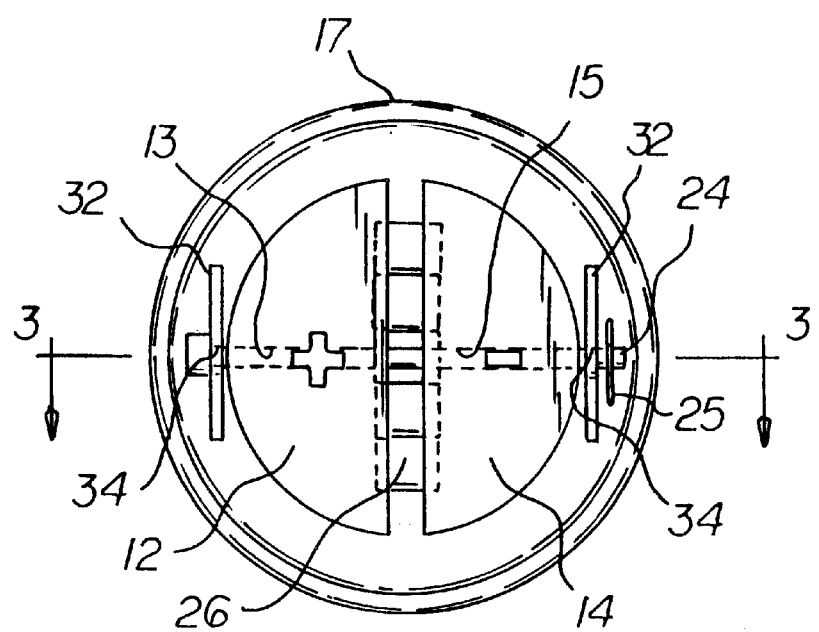
FIG. 2 is a bottom view of the embodiment of the magnet assembly shown in FIG. 1.
Figure 3:
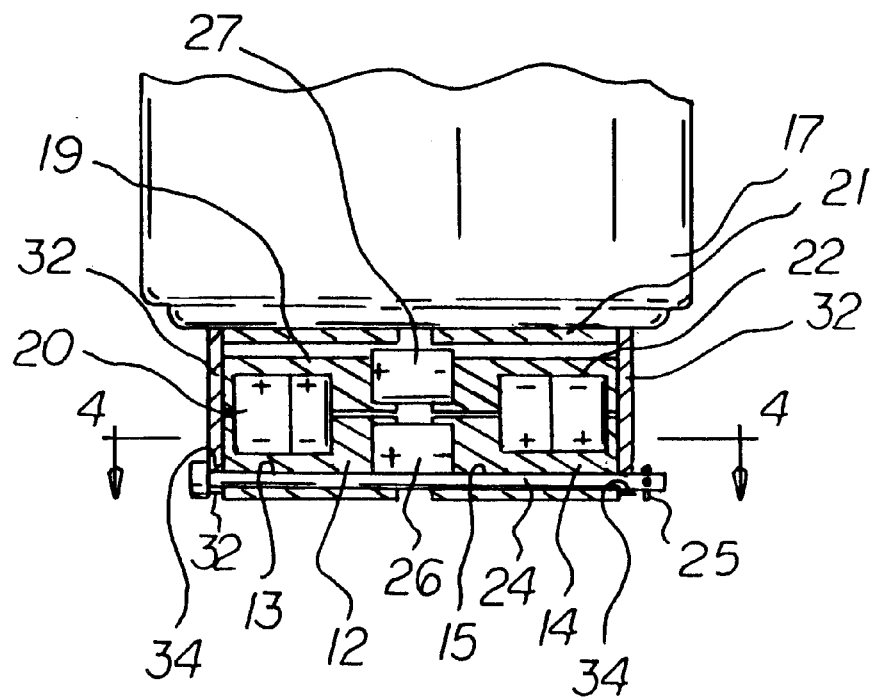
FIG. 3 is a cross-sectional view of the embodiment of the magnet assembly of FIG. 2 taken along line 3—3 thereof.
Figure 4:
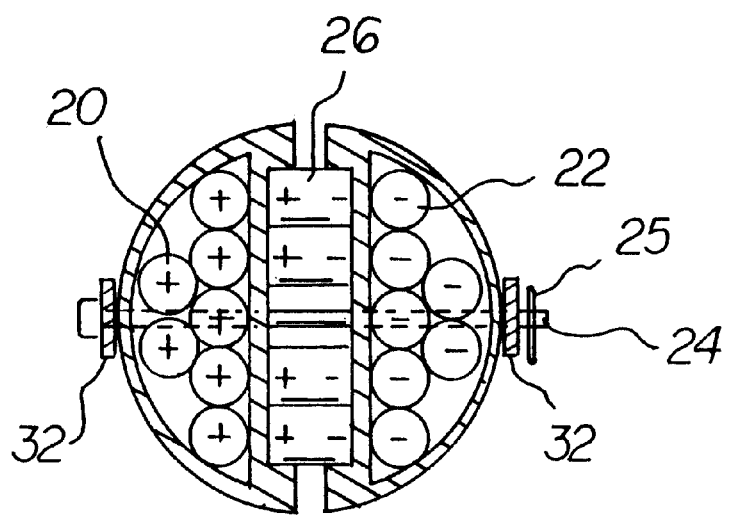
FIG. 4 is a cross-sectional view of the embodiment of the magnet assembly of FIG. 3 taken along line 4—4 thereof.
Figure 5:
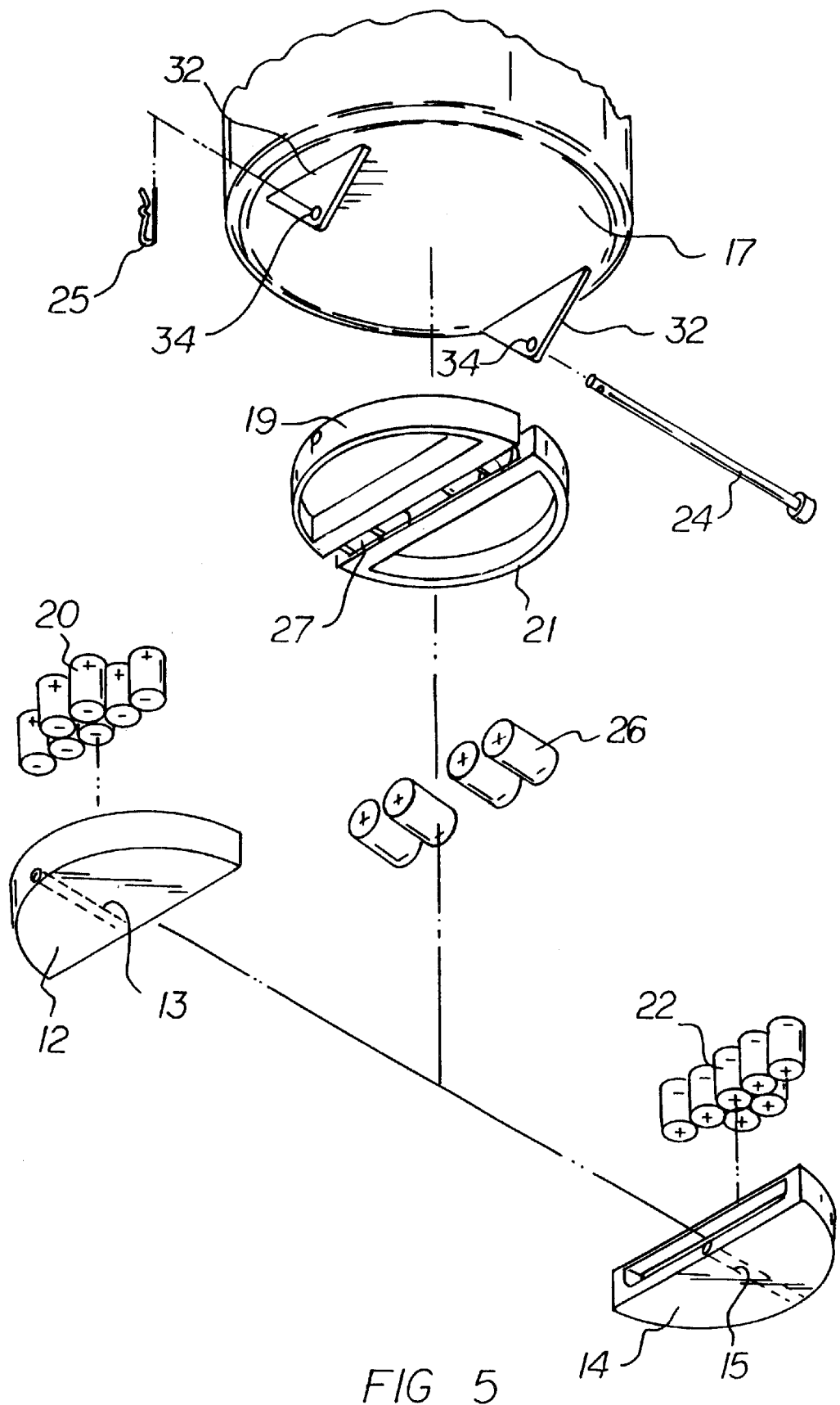
FIG. 5 is an exploded perspective view of the embodiment of the invention shown in FIGS. 1–4.
Figure 6:
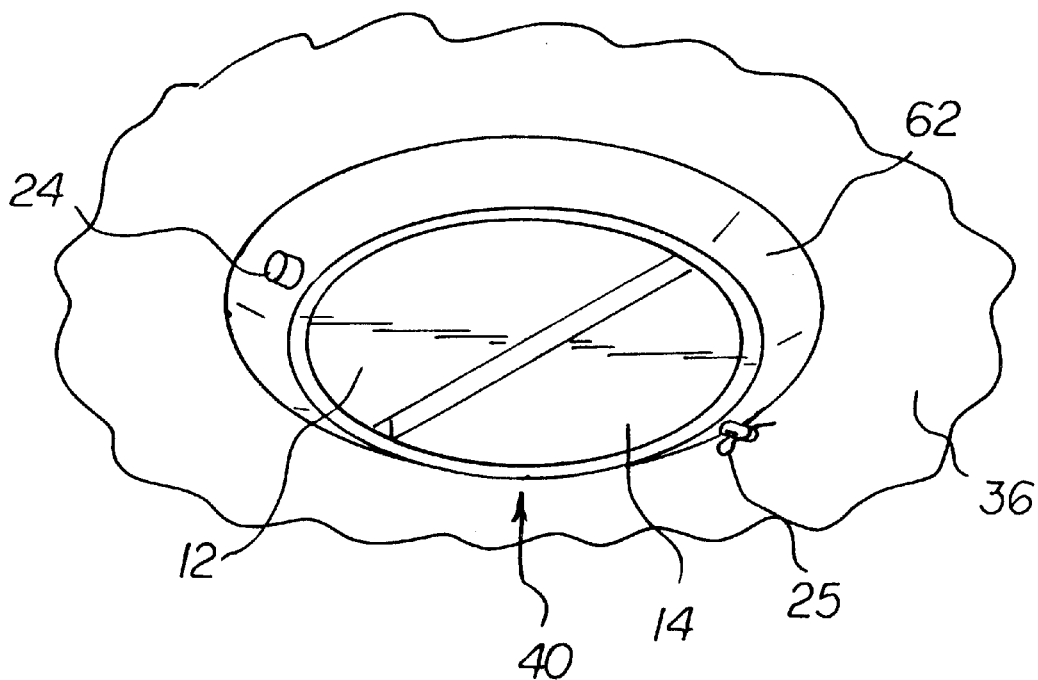
FIG. 6 is a bottom perspective view showing a second embodiment of the magnet assembly of the invention installed in an oil pan.
Figure 7:
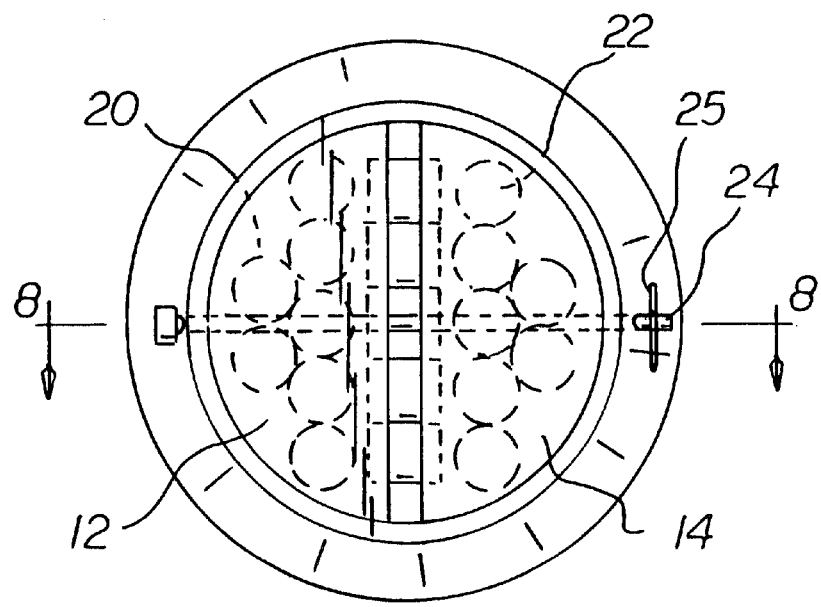
FIG. 7 is a bottom view of the embodiment of the magnet assembly shown in FIG. 6.

With reference to the drawings, a new and improved magnet assembly for an oil filter and an oil pan embodying the principles and concepts of the present invention will be described.

Turning to FIGS. 1–5, there is shown a first embodiment of the magnet assembly of the invention for an oil filter canister generally designated by reference numeral 10. In the first embodiment, a magnet assembly for an oil filter 10 comprises a first bottom magnet unit reception cup member 12 made from ferromagnetic material, wherein the first bottom magnet unit reception cup member 12 includes a first retention pin reception channel 13. A second bottom magnet unit reception cup member 14 is made from ferromagnetic material and is located adjacent to the first bottom magnet unit reception cup member 12 and is coplanar therewith. The second bottom magnet unit reception cup member 14 includes a second retention pin reception channel 15 which is in registration with the first retention pin reception channel 13. A plurality of first magnet units 20 are placed in the first bottom magnet unit reception cup member 12 in a first magnetic polarity orientation. A plurality of second magnet units 22 are placed in the second bottom magnet unit reception cup member 14 in a second magnetic polarity orientation. The second magnetic polarity orientation is opposite the first magnetic polarity orientation. A locking pin 24 is received in the first retention pin reception channel 13 and the second retention pin reception channel 15. Assembly-to-vehicle mounting means, connected to the first bottom magnet unit reception cup member 12 and the second bottom magnet unit reception cup member 14, are provided for mounting the magnet assembly apparatus 10 onto the portion of a motor vehicle. The locking pin 24 serves both to stabilize the first bottom magnet unit reception cup member 12 with respect to the second bottom magnet unit reception cup member 14 and to fix the first retention pin reception channel 13 and the second bottom magnet unit reception cup member 14 to the assembly-to-vehicle mounting means.

A locking clip 25 is connected at an end of the locking pin 24 for preventing the locking pin 24 from slipping out from the first retention pin reception channel 13 and the second retention pin reception channel 15 after the locking pin is received therein and passes through support members 32 as will be explained further below.

Third magnet units 26 are oriented transversely between the first bottom magnet unit reception cup member 12 and the second bottom magnet unit reception cup member 14. The third magnet units 26 are oriented along a third magnetic polarity orientation which causes magnetic fields of the first magnet units 20 and the second magnet units 22 to be reinforced. The third magnet units 26 also contribute to stabilization of the first retention pin reception channel 13 with respect to the second bottom magnet unit reception cup member 14. To facilitate retention of the third magnetic units 26, suitable magnetic unit receiving receptacles are formed in the confronting faces of the first and second bottom magnet unit reception cup members 12 and 14, substantially as depicted in FIGS. 2–5.

Also, a first top magnet unit reception cup member 19, made from ferromagnetic material, can be located opposite the first bottom magnet unit reception cup member 12, wherein the first magnet units 20 are located between the first bottom magnet unit reception cup member 12 and the first top magnet unit reception cup member 19. Also, a second top magnet unit reception cup member 21, made from ferromagnetic material, can be located adjacent to the first top magnet unit reception cup member 19, wherein the second magnet units 22 are located between the second bottom magnet unit reception cup member 14 and the second top magnet unit reception cup member 21. The first top magnet unit reception cup member 19 is stabilized with respect to the first bottom magnet unit reception cup member 12 by virtue of the magnetic attraction provided by the first magnet units 20. Similarly, the second top magnet unit reception cup member 21 is stabilized with respect to the second bottom magnet unit reception cup member 14 by virtue of the magnetic attraction provided by the second magnet units 22.

Also, fourth magnet units 27 can be provided and oriented transversely between the first top magnet unit reception cup member 19 and the second top magnet unit reception cup member 21. The fourth magnet units 27 also contribute to the stabilization of the entire magnet assembly apparatus 10 by virtue of magnetic interactions between the fourth magnet units 27 and the first magnet units 20 and the second magnet units 22. The fourth magnet units 27 are oriented along a fourth magnetic polarity orientation which causes magnetic fields of the first magnet units 20, the second magnet units 22, and the third magnet units 26 to be reinforced. To facilitate retention of the fourth magnetic units 27, suitable magnetic unit receiving receptacles are formed in the confronting faces of the first and second top magnet unit reception cup members 19 and 21, substantially as depicted in FIGS. 2–5. The magnetic units 20, 22, 26 and 27 contemplated for use in the present invention are conventional cylindrical magnets preferably of the neo-dymium iron boron type.

More specifically, with the first embodiment of the invention, the portion of a motor vehicle to which the magnet assembly apparatus 10 is attached is a top of an oil filter 17. The magnet assembly-to-vehicle mounting means include magnet unit support members 32 substantially as shown and suitably attached to a housing of an otherwise conventional oil filter 17 such as that commonly used with or on an engine, typically an automobile or truck internal combustion engine. The magnet unit support members 32 include lock pin reception channels 34. Portions of the locking pin 24 are in registration with the lock pin reception channels 34 for retaining the magnet assembly apparatus 10 on the portion of an oil filter housing and thus, on a portion of a motor vehicle.

To use the embodiment of the invention shown in FIGS. 1–5, a plurality of first magnet units 20 are placed in the first bottom magnet unit reception cup member 12 in the first magnetic polarity orientation. A plurality of second magnet units 22 are placed in the second bottom magnet unit reception cup member 14 with the second magnetic polarity orientation, which is opposite to the first magnetic polarity orientation. A plurality of third magnet units 26 are placed transversely with respect to the first magnet units 20 and the second magnet units 22 in the third magnetic polarity orientation. The fourth magnet units 27 are placed transversely along the fourth magnetic polarity orientation between the first top magnet unit reception cup member 19 and the second top magnet unit reception cup member 21. Then, the first top magnet unit reception cup member 19 is placed on top of the first magnet units 20, and the second top magnet unit reception cup member 21 is placed on top of the second magnet units 22. As a result, the magnet assembly apparatus 10 is fully assembled.

Then, the magnet assembly apparatus 10 is placed between the magnet unit support members 32, and the locking pin 24 is threaded through the first lock pin reception channels 34 in the first magnet unit support member 32, the first retention pin reception channel 13, the second retention pin reception channel 15, and the second lock pin reception channel 34 in the second magnet unit support member 32. Then, the locking clip 25 is placed on the end of the locking pin 24. In this way, the magnet assembly apparatus 10 is secured to the oil filter cartridge 17.

When lubricating oil circulates in the engine, ferrous or metal particles in the lubricating oil are attracted to the magnetic fields provided by the respective magnet units, and those particles are trapped on the inside top surface of the oil filter cartridge 17. When an oil filter 17 is to be replaced, the magnet assembly apparatus 10 is removed from the old oil filter 17 and is installed on a new oil filter cartridge 17.

Turning to FIGS. 6–9, in which a second embodiment of the invention is shown, reference numerals are shown that correspond to like reference numerals that designate like elements shown in the other figures. In addition, the portion of a motor vehicle to which the magnet assembly apparatus 40 is attached is an oil pan member 36. In this respect, the magnet assembly-to-vehicle mounting means include a magnet support unit 55 which includes a first attachment ring portion 62 which includes a pair of third retention pin reception channels 56 and which includes a support connector portion 63 extending upward from the first attachment ring portion 62. The first bottom magnet unit reception cup member 12 and the second bottom magnet unit reception cup member 14 are received in the magnet support unit 55 and secured to the magnet support unit 55 by the locking pin 24 which is threaded through the third retention pin reception channels 56, the first retention pin reception channel 13, and the second retention pin reception channel 15. The support connector portion 63 includes external threads 65.

A second attachment ring 44 is attached to an inside portion of the oil pan member 36. The second attachment ring 44 includes internal threads 50, and the internal threads 50 are engaged with the external threads 65 when the magnet assembly apparatus 40 is attached to the oil pan member 36.

To use the embodiment of the invention shown in FIGS. 6–9, the second attachment ring 44 is attached to the inside of the oil pan member 36 using fasteners 52. The second attachment ring 44 surrounds a relatively large opening in the oil pan member 36. The magnet support unit 55 is screwed into the second attachment ring 44. That is, the external threads 65 of the support connector portion 63 are screwed into the internal threads 50 of the second attachment ring 44.

An assembly of magnets and cups 37, similar to that described above in connection with the first embodiment of the invention, is also formed. This assembly of magnets and cups 37 includes the first bottom magnet unit reception cup member 12, the first magnet units 20, the first top magnet unit reception cup member 19, the second bottom magnet unit reception cup member 14, the second magnet units 22, the second top magnet unit reception cup member 21, the third magnet units 26, and the fourth magnet units 27.

To secure the assembly of magnets and cups in the magnet support unit 55, the assembly of magnets and cups 37 is inserted into the hollow interior of the magnet support unit 55. Then, the first retention pin reception channel 13 and the second retention pin reception channel 15 are placed in registration with the third retention pin reception channels 56 in the first attachment ring portion 62. Then, the locking pin 24 is threaded through the third retention pin reception channels 56, the first retention pin reception channel 13, and the second retention pin reception channel 15. Finally, the locking clip 25 is placed on the end of the locking pin 24. To remove the assembly of magnets and cups from the oil pan member 36, the process is reversed.

When lubricating oil circulates in the engine, ferrous or metal particles in the lubricating oil are attracted to the magnetic fields provided by the respective magnet units, and those particles are trapped on the oil-facing top surface 41 of the magnet support unit 55. As shown by the arrows 42 in FIG. 8, oil flows next to the oil-facing top surface 41 of the magnet support unit 55.

Turning to FIGS. 10–13, a third embodiment of the invention is shown. Reference numerals are shown that correspond to like reference numerals that designate like elements shown in the other figures. In addition, the first bottom magnet unit reception cup member 12 and the second bottom magnet unit reception cup member 14 are formed as a single, integrated combination first/second cup member 28 which includes a first cup portion 30 and a second cup portion 31 separated by a inside cup wall 33. In this respect, the first retention pin reception channel 13 and the second retention pin reception channel 15 are formed as a combination first/second retention pin reception channel 35.

To assemble the combination first/second cup member 28, the first magnet units 20 are placed in the first cup portion 30 with a first magnetic polarity orientation, and the second magnet units 22 are placed in the second cup portion 31 with a second magnetic polarity orientation which is opposite to the first magnetic polarity orientation. The magnetic interaction between the first magnet units 20, the combination first/second cup member 28, and the second magnet units 22 keeps the first magnet units 20 and the second magnet units 22 retained in the combination first/second cup member 28. Moreover, due to the relatively thick base of cup member 28, the latter functions as an effective shunt in the aforementioned magnetic circuit thereby compressing and redirecting the magnetic flux field into the region of oil flow at the proximally located portion of the filter housing. The use of such a "magnetic shunt" to redirect and compress the magnetic flux field in such applications is more fully described in my prior U.S. Pat. No. 5,510,024 in connection with FIGS. 9 and 10 therein, which description hereby is incorporated herein by this reference.

Figure 10:
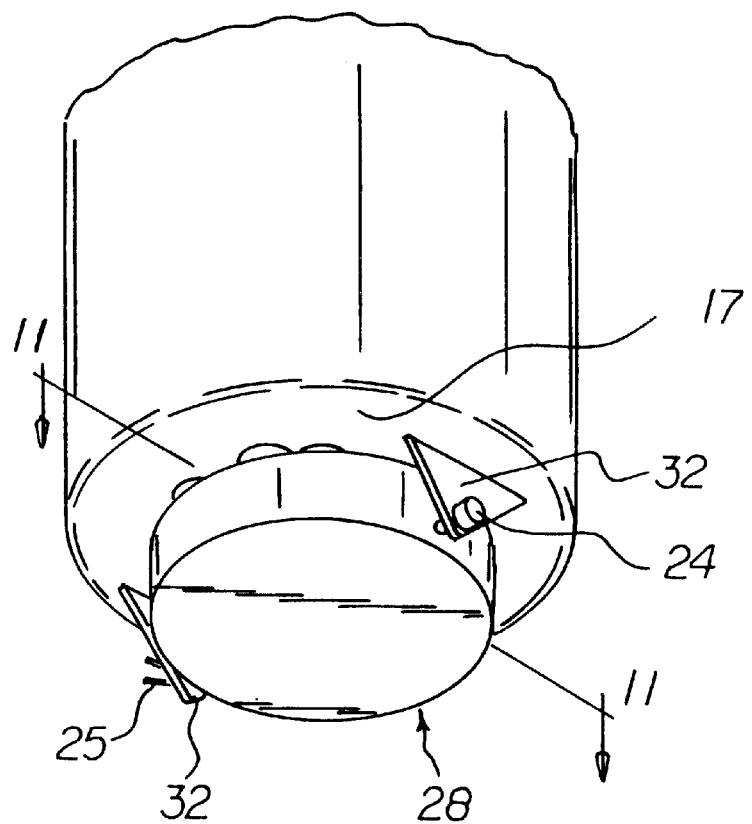
FIG. 10 is a bottom perspective view showing a third embodiment of the magnet assembly of the invention installed on an oil filter housing.
Figure 11:
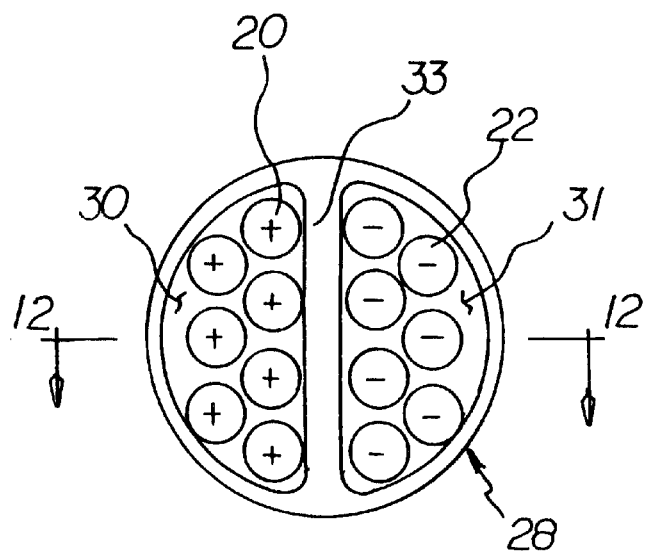
FIG. 11 is a top view of the embodiment of the invention shown in FIG. 10 taken along line 11—11 thereof.
Figure 12:
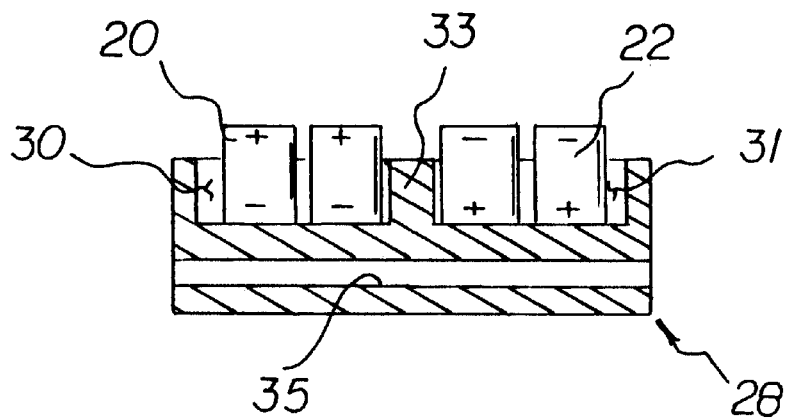
FIG. 12 is a cross-sectional view of the embodiment of the invention shown in FIG. 11 taken along line 12—12 thereof.
Figure 13:
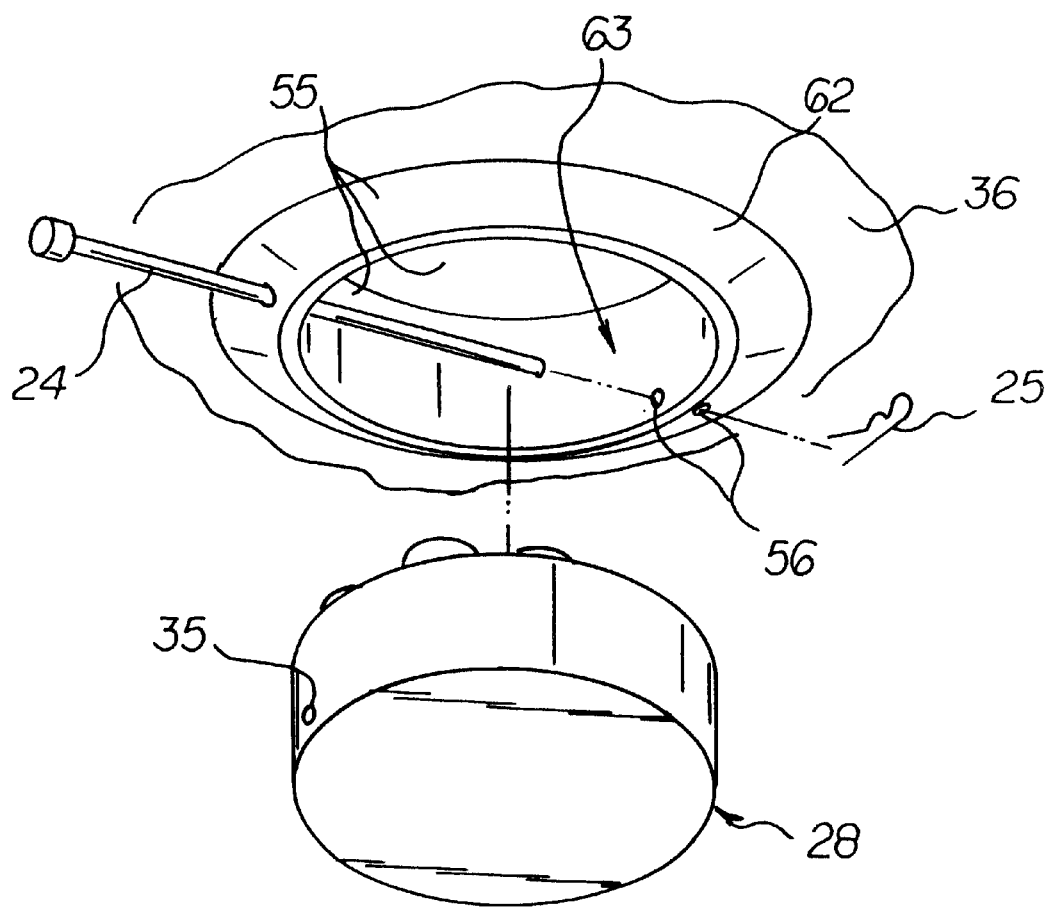
FIG. 13 is a partial exploded perspective view of the embodiment of the invention shown in FIGS. 10–12, to be installed in an oil pan member.

To use the combination first/second cup member 28 embodiment of the invention with the oil filter 17, as shown in FIG. 10, the combination first/second retention pin reception channel 35 is placed in registration with the lock pin reception channels 34 of the magnet unit support members 32, and the locking pin 24 is threaded therethrough. Then, the locking clip 25 is placed on the end of the locking pin 24.

To use the combination first/second cup member 28 embodiment of the invention with the oil pan member 36, the second attachment ring 44, and the magnet support unit 55, as described above, the combination first/second retention pin reception channel 35 is placed in registration with the third retention pin reception channels 56, and the locking pin 24 is threaded therethrough. Then, the locking clip 25 is placed at the end of the locking pin 24. To remove the combination first/second cup member 28 from the oil pan member 36, the above-described procedure is reversed.

The components of the magnet assembly for an oil filter and an oil pan of the invention can be made from inexpensive and durable metal, especially ferromagnetic material, and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved magnet assembly that is low in cost, relatively simple in design and operation, and which is an advantageous improvement for removable and reusable magnet units installed on oil filters. With the invention, a magnet assembly is provided which is an improvement in removable and reusable magnet units installed in oil pans.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A magnet assembly apparatus for attachment to a portion of a motor vehicle comprising:
    a first magnet unit reception cup member made from ferromagnetic material,
    a second magnet unit reception cup member, made from ferromagnetic material, located adjacent to said first magnetic unit reception cup member in a substantially juxtaposed manner therewith along and with respect to a first direction, wherein open ends of said cup members face in a second direction towards said portion of a motor vehicle that is substantially orthogonal to said first direction,
    a plurality of first magnetic units placed in said first magnet unit reception cup member in a first magnetic polarity orientation along and with respect to said second direction,
    a plurality of second magnet units placed in said second magnet unit reception cup member in a second magnetic polarity orientation along with and respect to said second direction, wherein said second magnetic polarity orientation is opposite said first magnetic polarity orientation, and
    assembly-to-vehicle mounting means, connected to said first magnet unit reception cup member and said second magnet unit reception cup member, for mounting the magnet assembly apparatus onto the portion of a motor vehicle.

2. The apparatus of claim 1 wherein said first magnet unit reception cup member includes a first retention pin reception channel,
    wherein said second magnet unit reception cup member includes a second retention pin reception channel which is in registration with said first retention pin reception channel, said apparatus further including:
    a locking pin received in said first retention pin reception channel and said second retention pin reception channel, and
    a locking clip connected at an end of said locking pin for preventing said locking pin from slipping out from said first retention pin reception channel and said second retention pin reception channel.

3. The apparatus of claim 1, further including:
    third magnet units oriented transversely between adjacent sidewalls of said first magnet unit reception cup member and said second magnet unit reception cup member along and with respect to a third direction that is orthogonal to said first direction and said second direction.

4. The apparatus of claim 3 wherein magnetic polarity orientations of said third magnetic units are oriented to cause magnetic fields of said first magnet units and said second magnet units to be reinforced.

5. The apparatus of claim 3, further including:
    a third magnet unit reception cup member, made from ferromagnetic material, having an open end located opposite the open end of said first magnetic unit reception cup member, wherein said first magnetic units are located between said first magnet unit reception cup member and said third magnet unit reception cup member, and
    a fourth magnet unit having an open end located adjacent the open end of said second magnet unit reception cup member, wherein said second magnet units are located between said second magnet unit reception cup member and said fourth magnet unit reception cup member.

6. The apparatus of claim 5, further including:
    fourth magnet units oriented transversely between adjacent sidewalls of said third magnet unit reception cup member and said fourth magnet unit cup reception cup member.

7. The apparatus of claim 6 wherein magnetic polarities of said fourth magnetic units are oriented to cause magnetic fields of said first magnet units, said second magnetic units, and said third magnet units.

8. The apparatus of claim 1 wherein said assembly-to-vehicle mounting means include:
    magnet unit support members attached to a housing of an oil filter, wherein said magnet unit support members include lock pin reception channels, and
    a locking pin received in said pin reception channels.

9. The apparatus of claim 1 wherein said first magnet unit reception cup member includes a first retention pin reception channel,
    wherein said second magnet unit reception cup member includes a second retention pin reception channel which is in registration with said first retention pin reception channel, and
    a locking pin received in said first retention pin reception channel and said second retention pin reception channel,
    wherein said assembly-to-vehicle mounting means include:
    a magnet support unit which includes a first attachment ring portion which includes a pair of third retention pin reception channels and which includes a support connector portion extending from said first attachment ring portion, wherein said first magnet unit reception cup member and said second magnet unit reception cup member are received in said magnet support unit and secured to said magnet support unit by said locking pin passing through said third retention pin reception channels, said first retention pin reception channel, and said second retention pin reception channel, wherein said support connector portion includes external threads, and a second attachment ring attached to an inside portion of said motor vehicle portion, wherein said second attachment ring includes internal threads, wherein said internal threads are engaged with said external threads when said magnet assembly apparatus is attached to said vehicle portion.

10. A magnet assembly apparatus for attachment to a portion of a motor vehicle comprising:

a magnet unit reception cup member made of ferromagnetic material including a first cup portion separated from a second cup portion by a common cup wall such that said second cup portion is located adjacent to said first portion in a substantially juxtaposed manner therewith along and with respect to a first direction, wherein open ends of said cup portions face in a second direction towards said portion of a motor vehicle that is substantially orthogonal to said first direction, a plurality of first magnetic units placed in said first cup portion in a first magnetic polarity orientation along and with respect to said second direction, a plurality of second magnet units placed in said second cup portion in a second magnetic polarity orientation along with and respect to said second direction, wherein said second magnetic polarity orientation is opposite said first magnetic polarity orientation, and assembly-to-vehicle mounting means, connected to said magnet unit reception cup member, for mounting the magnet assembly apparatus onto the portion of a motor vehicle.

* * * * *